US008280539B2

(12) United States Patent
Jehan

(10) Patent No.: US 8,280,539 B2
(45) Date of Patent: Oct. 2, 2012

(54) METHOD AND APPARATUS FOR AUTOMATICALLY SEGUEING BETWEEN AUDIO TRACKS

(75) Inventor: Tristan Jehan, Somerville, MA (US)

(73) Assignee: The Echo Nest Corporation, Somerville, MA (US)

(*) Notice: Subject to any disclaimer, the term of this patent is extended or adjusted under 35 U.S.C. 154(b) by 1073 days.

(21) Appl. No.: 12/061,374

(22) Filed: Apr. 2, 2008

(65) Prior Publication Data

US 2008/0249644 A1 Oct. 9, 2008

Related U.S. Application Data

(60) Provisional application No. 60/922,115, filed on Apr. 6, 2007.

(51) Int. Cl.
G06F 17/00 (2006.01)
(52) U.S. Cl. .............. 700/94; 707/769; 381/81; 84/609; 84/610; 84/611; 84/612
(58) Field of Classification Search .................. 700/94
See application file for complete search history.

(56) References Cited

U.S. PATENT DOCUMENTS

| 5,711,818 | A | * | 1/1998 | Jain ................................... 134/6 |
| 5,918,223 | A | | 6/1999 | Blum et al. |
| 5,919,047 | A | | 7/1999 | Sone |
| 6,608,803 | B2 | | 8/2003 | Inoue et al. |
| 7,013,301 | B2 | | 3/2006 | Holm et al. |
| 7,193,148 | B2 | | 3/2007 | Cremer et al. |
| 7,273,978 | B2 | | 9/2007 | Uhle |
| 7,277,766 | B1 | | 10/2007 | Khan et al. |
| 7,518,053 | B1 | * | 4/2009 | Jochelson et al. ............... 84/609 |
| 7,612,275 | B2 | * | 11/2009 | Seppanen et al. ............... 84/600 |
| 7,698,009 | B2 | * | 4/2010 | Cotey et al. ...................... 700/94 |
| 2002/0172379 | A1 | * | 11/2002 | Cliff ................................. 381/119 |
| 2003/0205124 | A1 | * | 11/2003 | Foote et al. ...................... 84/608 |
| 2004/0122662 | A1 | * | 6/2004 | Crockett ...................... 704/200.1 |
| 2006/0065105 | A1 | | 3/2006 | Iketani et al. |
| 2006/0075886 | A1 | * | 4/2006 | Cremer et al. ................... 84/635 |
| 2006/0153286 | A1 | * | 7/2006 | Andersen et al. ............. 375/229 |
| 2007/0261537 | A1 | * | 11/2007 | Eronen et al. .................... 84/611 |
| 2008/0097633 | A1 | * | 4/2008 | Jochelson et al. ............... 700/94 |
| 2008/0124042 | A1 | * | 5/2008 | Divakaran et al. ............. 386/52 |
| 2008/0189330 | A1 | | 8/2008 | Hoos et al. |
| 2008/0236371 | A1 | * | 10/2008 | Eronen ........................... 84/622 |
| 2008/0275580 | A1 | * | 11/2008 | Andersen ........................ 700/94 |

OTHER PUBLICATIONS

Zils, et al, Musical Mosaicing, Dec. 6-8, 2003, In Proceedings of the COST G-6 Conference on Digital Audio Effects (DAFx-01) Limerick, Ireland.
Jehan, Perceptual Synthesis Engine: An Audio-Driven Timbre Generator, Sep. 2001, Massachusetts Institute of Technology, Cambridge, MA.

(Continued)

Primary Examiner — Paul McCord
(74) Attorney, Agent, or Firm — SoCal IP Law Group LLP; Steven C. Sereboff; John E. Gunther

(57) ABSTRACT

There is disclosed a method and storage media for automatically segueing between a first audio track and a second audio track. The first audio track and the second audio track may be analyzed to determine a preferred transition window. Segueing from the first track to the second track may occur during the preferred transition window.

28 Claims, 8 Drawing Sheets

OTHER PUBLICATIONS

Jehan, Event-Synchronous Music Analysis/Synthesis, Oct. 5-8 2004, Proceedings of the 7th International Conference on Digital Audio Effects (DAFx'04), Naples, Italy.

Jehan, Perceptual Segment Clustering for Music Description and Time-Axis Redundancy Cancellation, 2004, Massachusetts Institute of Technology Media Laboratory, Cambridge, MA.

Jehan, Downbeat Prediction by Listening and Learning, Oct. 16-19, 2005, IEEE Workshop on Applications of Signal Processing to Audio and Acoustics, New Paltz, NY.

Jehan, Hierarchical Multi-Class Self Similarities, Oct. 16-19, 2005, IEEE Workshop on Applications of Signal Processing to Audio and Acoustics, New Paltz, NY.

Unknown, Sounds Good?, magazine, Jun. 2006, 1 page.

Seppänen, Jarno, Joint Beat & Tatum Tracking from Music Signals, Journal, 6 pages.

Cano, Pedro, A Review of Algorithums for Audio Fingerprinting, Journal, 5 pages.

Unknown, Principal Components analysis, Wikipedia, accessed on Feb. 2, 2008, http://en.wikipedia.org/wiki/Principal_components_analysis.

De A Vila, Joseph, Web Tools to Free Your Inner DJ, The Wall Street Journal, Mar. 6, 2008, 3 pages.

* cited by examiner

US 8,280,539 B2

METHOD AND APPARATUS FOR AUTOMATICALLY SEGUEING BETWEEN AUDIO TRACKS

RELATED APPLICATION INFORMATION

This patent claims benefit of the filing date of provisional patent application Ser. No. 60/922,115, filed Apr. 6, 2007, entitled "Automated Sound Identification".

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to the playback of recorded music and, specifically, to processes for automatically and seamlessly transitioning between recorded audio tracks.

2. Description of the Related Art

When found on a musical score, the term "segue" instructs the performer to continue the next section of the musical composition without a pause. In recorded music or in live performance, "segue" commonly means a seamless transition between one song and another. Within this description, "segue" means a gradual and seamless transition between two recorded audio tracks, such as the "mixing" performed by a DJ in a nightclub.

Beat matching has been used to automatically segue between recorded audio tracks. The beats of each track are identified and one or both tracks may be time-scaled to equalize their beat frequency and phase. Time-scaling is a known technique of stretching or accelerating the playback of a recorded track without altering the acoustic spectrum. The playback volume of the two tracks may then be cross-faded to transition the sound from the first track to the second track. Beat matching maintains a consistent beat during the transition between tracks for the benefit of persons listening and/or dancing to the music being played, but beat matching alone may not provide the smoothest transition between audio tracks.

Throughout this description, elements appearing in flow charts are assigned three-digit reference designators, where the most significant digit is the figure number and the two least significant digits are specific to the element. An element that is not described in conjunction with a flow chart may be presumed to have the same characteristics and function as a previously-described element having a reference designator with the same least significant digits.

DETAILED DESCRIPTION

Description of Processes

Figure 1:
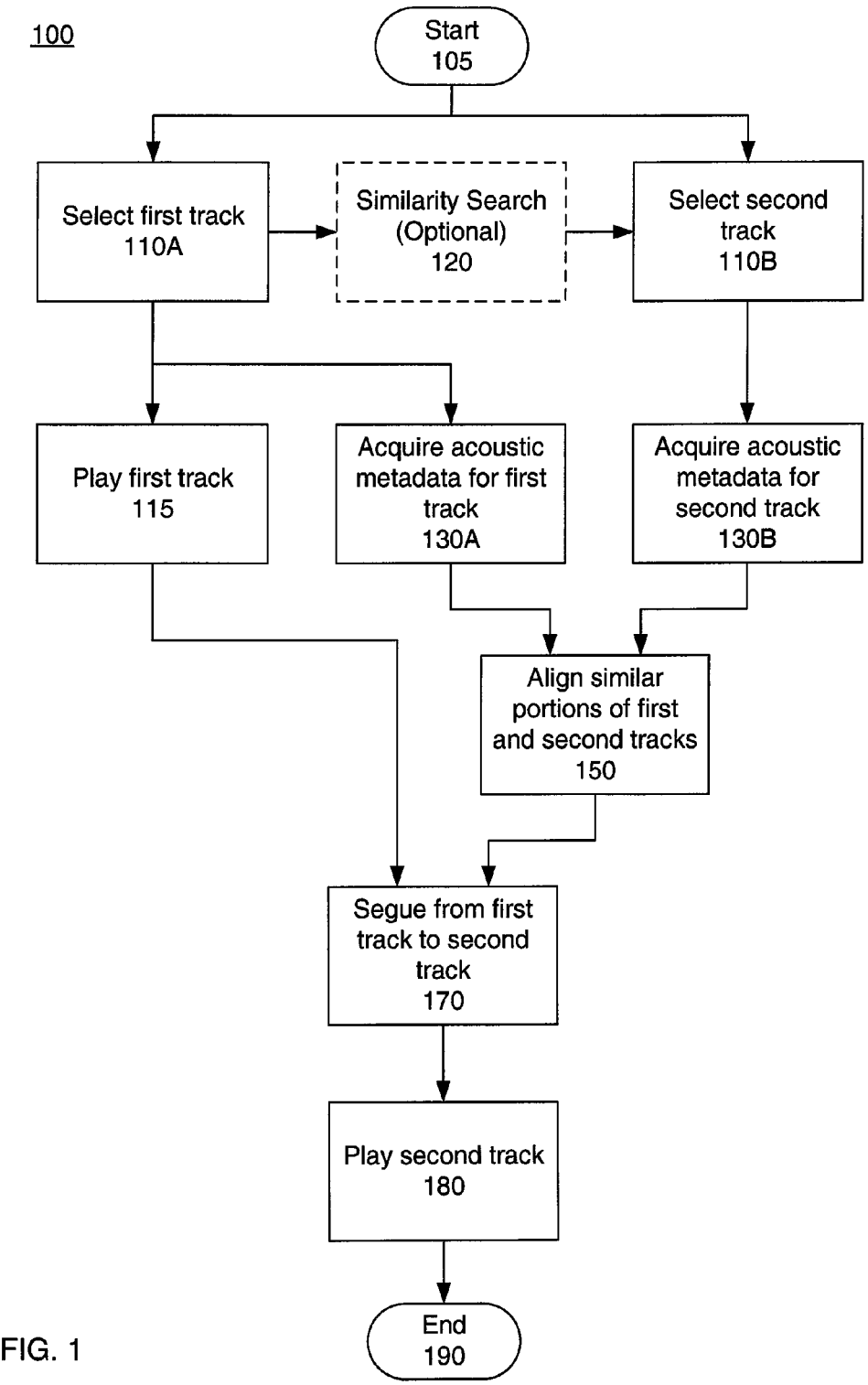
FIG. 1 is a flow chart of a process to automatically segue between two audio tracks.

Referring now to FIG. 1, a process 100 for automatically segueing from the playback of a first audio track to the playback of a second audio track has both a start 105 and an end 190. However, the process 100 may be continuous in nature, in that the same actions may be used to segue from the second track to a third track and then to a fourth track and so on until a sequence, or play list, of tracks has been played. Within this description, the terms "automatically" and "automated" mean "without user intervention". An automated task may be initiated by a user but an automated task, once initiated, proceeds to a conclusion without further user action.

Within this description, a "track" is a digital data file containing audio information. A track may be stored on a storage device such as a hard disc drive, and may be a component of a library of audio tracks. A track may be a recording of a song or a section, such as a movement, of a longer musical composition. A track may be stored in any known or future audio file format. A track may be stored in an uncompressed format, such as a WAV file, or a compressed format such as an MP3 file.

At 110A, a first track may be selected. The selection of the first track may be made by a user, may be random, or may be the result of an automated search of a library of recorded audio tracks. The first track may be retrieved from a storage device which may store a library including a large plurality of recorded audio tracks.

At 110B, a second track may be selected. To allow a pleasing segue from the first track to the second track, the second track may be selected to be similar, in at least some aspects, to the first track. The second track may be selected by the user, or may be selected automatically. For example, the second track may be selected as the result of an automated search, at 120, of the library of recorded audio tracks specifically for tracks that are similar in sound, style, genre, or other characteristic to the first track. The automated search at 120 may use a process 720 that will be subsequently discussed in conjunction with FIG. 7, or may be any other known or future process for comparing audio tracks.

At 130A and 130B, acoustic metadata for the first track and the second track, respectively, may be acquired. In this description, "acoustic metadata" refers to a numerical or mathematical representation of the sound of a track. Some forms of acoustic metadata may be referred to as an "acoustic fingerprint" of a track. Acoustic metadata may be derived from analysis of the track. Acoustic metadata may include temporal information such as tempo, rhythm, beats, tatums, patterns, or other structures. Acoustic metadata may also include spectral information such as melody, pitch, harmony, or timbre. For the purpose of automatically segueing from the first track to the second track, the acoustic metadata acquired at 130A and 130B may divide each track into time slices or segments and provide spectral information for each segment.

The acoustic metadata may be in the form of one or more tables, vectors, matrices, and combinations thereof. Acoustic metadata may be stored on a storage device, which may be the same or different from the storage device storing the first and/or second tracks.

Acoustic metadata differs from explicit metadata, such as track title, artists, lyrics, and other factual information related to a recorded track. Acoustic metadata also differs from cultural metadata such as genre, style, mood, quality, and other qualitative information such as descriptive terms and tags related to a recorded track.

The acoustic metadata acquired at 130A and 130B may have been pre-computed and stored in a database or library, which may be the library storing the first track and the second track. If necessary, the acoustic metadata for one or both of the first track and the second track may be computed while the first track is playing at 115.

At 150, the acoustic metadata acquired at 130a and 130B may be analyzed to determine a preferred alignment between the tracks for segueing from the first track to the second track. Determining the preferred alignment may involve comparing the acoustic metadata of the two tracks, selecting a first transition portion within the first track and a second transition portion within the second track, and then aligning the first and second transition portions in time. The first and second transition portions may be selected to be the portions of the two tracks that are most similar according to a predetermined comparison method. The determination of the first and second portion windows may typically be limited to predetermined windows of each track. For example, for the purpose of segueing from one track to the next track in a play list, the first transition portion may be constrained to be within a predetermined window of the last 10 seconds (or last 5 percent) of the first track and the second transition portion may be constrained to be within a predetermined window of the first 20 seconds (or first 10 percent) of the second track. Typically, the predetermined window of the second track may be longer than the predetermined window of the first track. However, the predetermined window of the first track may be equal to or longer than the predetermined window in the second track. Additionally, the length of the first and second transition portions may be predetermined. For example, the length of the transition portions may be determined to be 3 seconds or 5 seconds or some other duration, or an equivalent number of beats or tatums or other rhythmic units. The length of the transition portions may be determined based on the musical style, tempo, or similarity of the first track and the second track.

During a segue between the first track and the second track, one or both tracks may be time-scaled to match the rhythm of the two tracks during the segue. The rhythms of the two tracks may be matched by equalizing the rates of the beats, downbeats, tatums, or other rhythmic structures between the two tracks. For ease of discussion, processes will be described in this patent in terms of tatums and tatum rates as the fundamental rhythmic units. It should be understood that the processes may be also performed based on beats, down-beats, and other rhythmic units.

In situations where the tatum rate of the first track and the tatum rate of the second track differ substantially, the track having the lower tatum rate may be up-sampled by a factor of 2 or 4 or another integer to avoid uncomfortable acceleration or deceleration of the beat during the segue. For example, segueing from a first track having a tatum rate of 130 tatums per minute to a second track having a tatum rate of 240 tatums per minute would require the first track to accelerate to nearly twice its normal speed during the segue. This problem may be avoided by up-sampling the first track by a factor of 2 to provide 260 samples per second.

Once the first and second transition portions have been determined and aligned, segueing from the first track to the second track may be done at 170. The playback of the second track may then continue at 180.

To segue from the first track to the second track at 170, one or both tracks may be time-scaled such that the tatum rates of the first and second tracks may be equalized. One or both tracks may also be time-shifted to offset the playback of the tracks such that the two transition portions and the tatum phases of the two tracks are aligned. Segueing from the first track to the second track may then be completed during the transition portions of each track. Segueing may include cross fading (reducing the volume of the first track while simultaneously increasing the volume of the second track) the two tracks. Segueing may also include a transition from the original tempo of the first track to the tempo of the second track. Details of the segueing process will be described subsequently.

While the process 100 has been described in terms of segueing from a first audio track to a second audio track, it should be recognized that the first and second audio tracks may be the same track. The process 100 may be advantageously used for segueing between a first portion of a track and a second portion of the same track to cause the track to loop endlessly, or to stretch or compress the duration of a track without changing the tempo or sound, for instance by jumping into other similar locations in the track.

Figure 2:
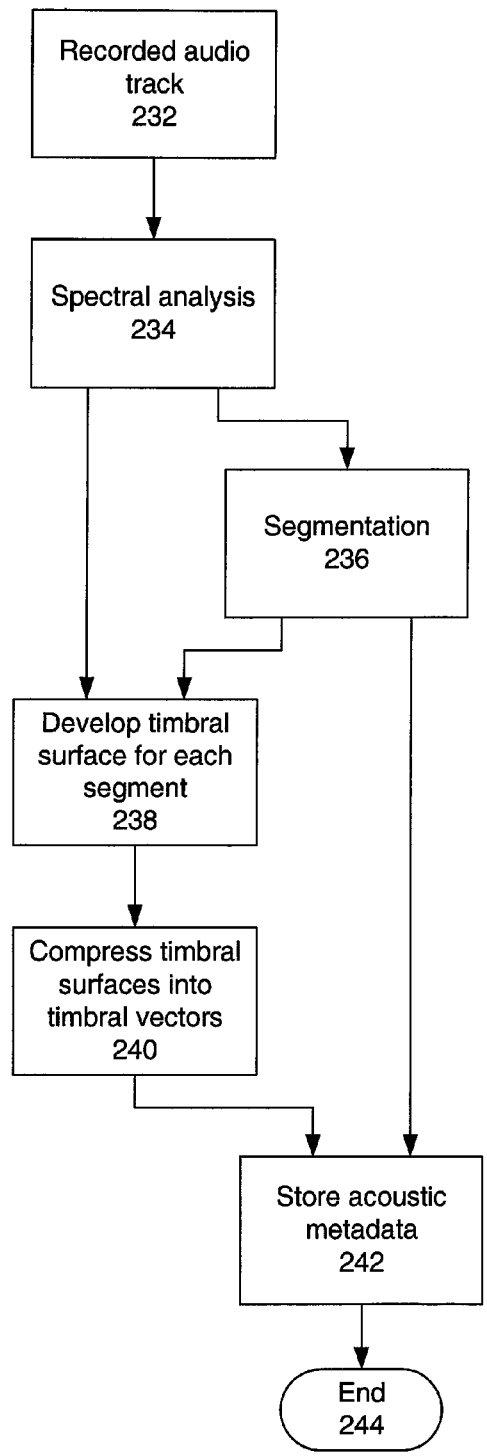
FIG. 2 is a flow chart of an exemplary process for acquiring acoustic metadata.

Referring to FIG. 2, a process to acquire acoustic metadata 230 may be suitable for use at 130 in the process 100. At 232, the digital data for a recorded track may be retrieved from a music library or other storage device. At 234, a spectral analysis of the recorded track may be performed and the track may be divided into segments at 236. Each segment may, for example, begin with an audible change in the sound of the track commonly termed an "onset". Each segment may begin with a distinct sound commonly termed the "attack" of the segment. The duration of segments may typically range from 60 milliseconds to 500 milliseconds or longer. Published Patent Application US2007/0291958A1 describes processes for developing an audio spectrogram of a track and for segmentation of the track based on onsets detected in the audio spectrogram. These processes may be suitable for use at 234 and 236 within the process 230. Paragraphs 0046-0061 and the associated figures of US 2007/0291958 A1 are incorporated herein by reference.

Figure 3A:
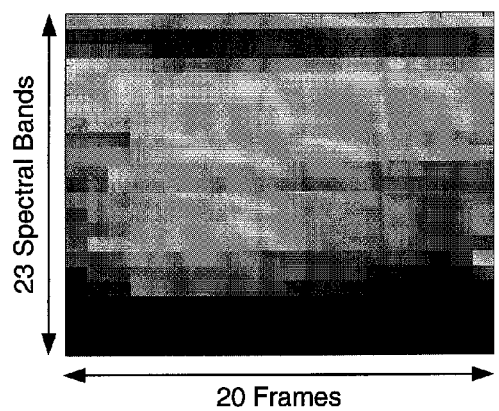
FIG. 3A is graphical depiction of exemplary acoustic metadata for a segment of an audio track.

At 238, a timbral surface may be developed for each of the segments defined at 236. Within this description, a timbral surface means a predetermined number of spectral samples taken at time intervals within a segment. The frequency spectrum of the track may be divided into a plurality of bands or other spectral-based low-level features, such as MFCCs (Mel Frequency Cepstral Coefficients), which are sampled multiple times during each segment. For example, the frequency spectrum may be divided into 23 Bark bands if the audio track was digitized at 22 kilosamples per second or 25 Bark bands if the audio track was digitized at 44 kilosamples per second. Further, a plurality of samples or frames may be acquired and stored for each segment of the audio track. For example, ten frames may be acquired within the first portion of the segment to capture the onset or attack, and the remaining frames may be distributed in time over the balance of the duration of the segment. FIG. 3A depicts a timbral surface consisting of 20 frames of 23 spectral bands. The timbral surface is represented by a matrix of squares representing the data points, where the value of each data point is indicated by the lightness/darkness of the corresponding square.

Referring back to FIG. 2, the timbral surfaces for the segments comprising the audio track may be compressed into timbral vectors at 240. The compression may be done using the known technique of principle component analysis. The relationship between a timbral vector and a timbral surface may be given by the following equation:

$$V_i = W(F_i - M) \quad (1)$$

wherein:

$V_i$=timbral vector for the i'th segment of a track

W=a weight matrix calculated from a training data set consisting of a large number of randomly selected tracks $F_i$=data vector describing the timbral surface of the i'th segment M=a mean vector calculated from the training data set.

Continuing the example from paragraph 0028, each data vector $F_i$ may be a 460×1 vector containing values for 20 frames of 23 spectral bands. The weight matrix W may be calculated by applying principle component analysis and/or independent component analysis to a training data set consisting of the timbral surfaces of a large number (100,000, for example) of randomly-selected segments extracted from a large number (1000, for example) of randomly selected tracks. Using principle component analysis, the weight matrix W may be calculated by first calculating the covariance matrix of the training data set, then calculating the eigenvectors and eigenvalues of the covariance matrix. The weight matrix W may be composed of the N eigenvectors having the highest eigenvalues, where N is the number of terms desired to describe each music segment. Thus the weight matrix W may be an N×460 matrix and each timbral vector $V_i$ may be an N×1 vector. N may be 8, 12 or some other number. The mean vector M may be the mean of the data vectors for the training set and will have the same number of values as the data vectors $F_i$.

Figure 3B:
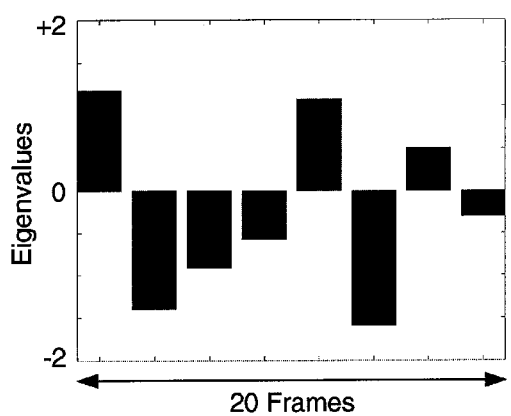
FIG. 3B is a graph showing the acoustic metadata of FIG. 3A after compression.
Figure 3C:
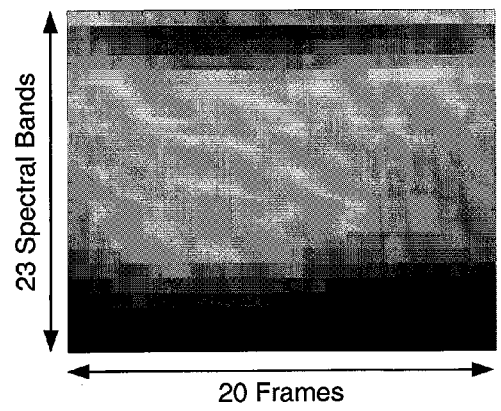
FIG. 3C is graphical depiction of acoustic metadata reconstructed from the compressed data of FIG. 3B.

FIG. 3B illustrates a timbral vector consisting of eight eigenvalues obtained by applying equation (1) to the timbral surface data depicted in FIG. 3A. FIG. 3C depicts a timbral surface reconstructed from the timbral vector of FIG. 3B. Comparing FIG. 3C with FIG. 3A shows that converting a timbral surface into a timbral vector, as described above, is not a lossless compression, but does retain most of the characteristics of the audio segment.

The timbral vectors for the segments of an audio track may be used directly as acoustic metadata for determining the optimum windows for segueing between two audio tracks. Alternatively, augmented timbral vectors may be formed by joining other types of data to the timbral vectors. For example, the acoustic metadata for each segment may be an augmented timbral vector that combines an 11×1 timbral vector where overall volume has been previously removed for the computation of the weight matrix W, and an additional value indicating the overall volume of each segment.

Figure 4:
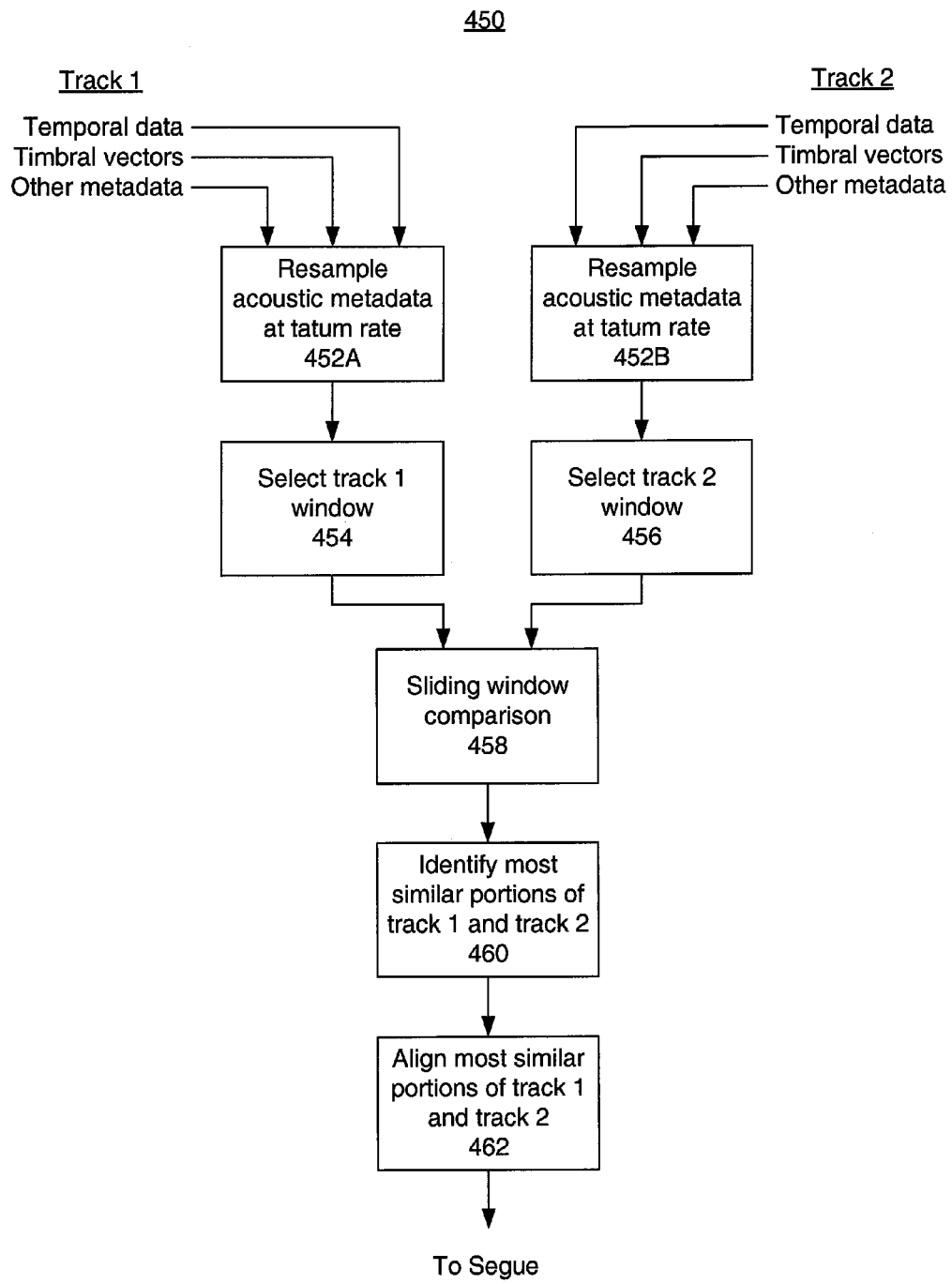
FIG. 4 is a flow chart of a process for identifying the optimum alignment between two audio tracks.

FIG. 4 is flow chart of a process 450 for aligning two audio tracks, which may be suitable for use at 150 in the process 100. The process 450 begins when a first track and a second track have been selected and acoustic metadata for each track has been retrieved. The acoustic metadata for each track may divide the track into segments or other temporal divisions and may include data derived from the low-level musical content of each temporal division. The acoustic metadata may be timbral vectors as formed by the method 230. The acoustic metadata may be some other data, which is presumed to be in vector form or convertible to vector form.

At 452A and 452B, at least some of the acoustic metadata for each track may be resampled at the tatum (or rhythmic division such as beat or downbeat) rate of the respective tracks. The tatum rate is the smallest division of the rhythm of a track and is typically a subdivision of the beat of the track. Published Patent Application US2007/0291958A1, appropriate portions of which were previously incorporated herein by reference, describes a method for extracting the tatum rate of an audio track. In situations where the tatum rates of the two track differ substantially, the track with the lower tatum rate may be up-sampled by a factor of 2 or 4 or some other integer to more nearly equalize the tatum rates.

At 454 a first window within the first track may be selected. The first window may define a time period within the first track in which segueing to the second track should occur. Similarly, at 456 a second window may be selected within the second track. Continuing a previous example, the first window may be selected to be the last 10 seconds (or last 5 percent) of the first track and the second window may be selected to be the first 20 seconds (or first 10 percent) of the second track. Both the first and second windows may be defined by quantities of tatums equivalent to the selected time spans of the windows. Although not shown in FIG. 4, the length, in tatums, of transition portions (the portions of each track during which the segueing will occur) of each track may also be determined.

At 458, a sliding-window comparison between every possible transition portion of the first track and every possible transition portion of the second track may be performed. The number of possible transition portions for the first track depends on the tatum rate of the first track, the length of the first window, and the length of the transition portion. For example, a track with 120 beats per minute and four tatums per beat has 8 tatums per second. Thus a first window having a length of 10 seconds contains 80 consecutive samples after resampling at the tatum rate. Similarly, a transition portion having a length of 5 seconds contains 40 consecutive samples after resampling at the tatum rate. A 40-sample transition portion can be located at 41 possible positions, in one-sample increments, within the first window. Similarly, assuming the tatum rate of the second track is the same, a second window having a length of 20 seconds 160 consecutive samples. A 40-sample transition portion can be located at 121 possible positions, in one-sample increments, within the second window.

To perform the sliding-window comparison at 458, the acoustic metadata or augmented acoustic metadata for each possible transition portion of the first track may be considered as a vector. Continuing the previous example and assuming that the metadata for each tatum contains 12 values, each possible transition portion within the first window and the second window can be represented as a 480-element vector. The sliding window comparison at 458 of the two tracks may then be performed by comparing each of the 41 vectors representing possible transition portions of the first track with each of the 121 vectors representing possible transition portions of the second track. Pairs of vectors may be compared, for example, by computing the Euclidean distance between them.

At 460, the most similar transition portions of the first track and the second track may be identified based on the results of the sliding window comparison at 458. In the case where the comparison is performed by calculating the Euclidean distance between pairs of vectors representing possible transition portions of the first and second tracks, respectively, the vector pair with the smallest Euclidean distance may identify the most similar transition portions.

At 462, the playback of the second track may be delayed or offset with respect to the playback of the first track such that the transition portions of the two tracks are aligned. The condition where similar portions of a first track and a second track have been identified and aligned will be referred to herein as a preferred transition window.

The process 450 may be done prior to playing the first track, or may be done in "real time" as the first track is playing.

Figure 5:
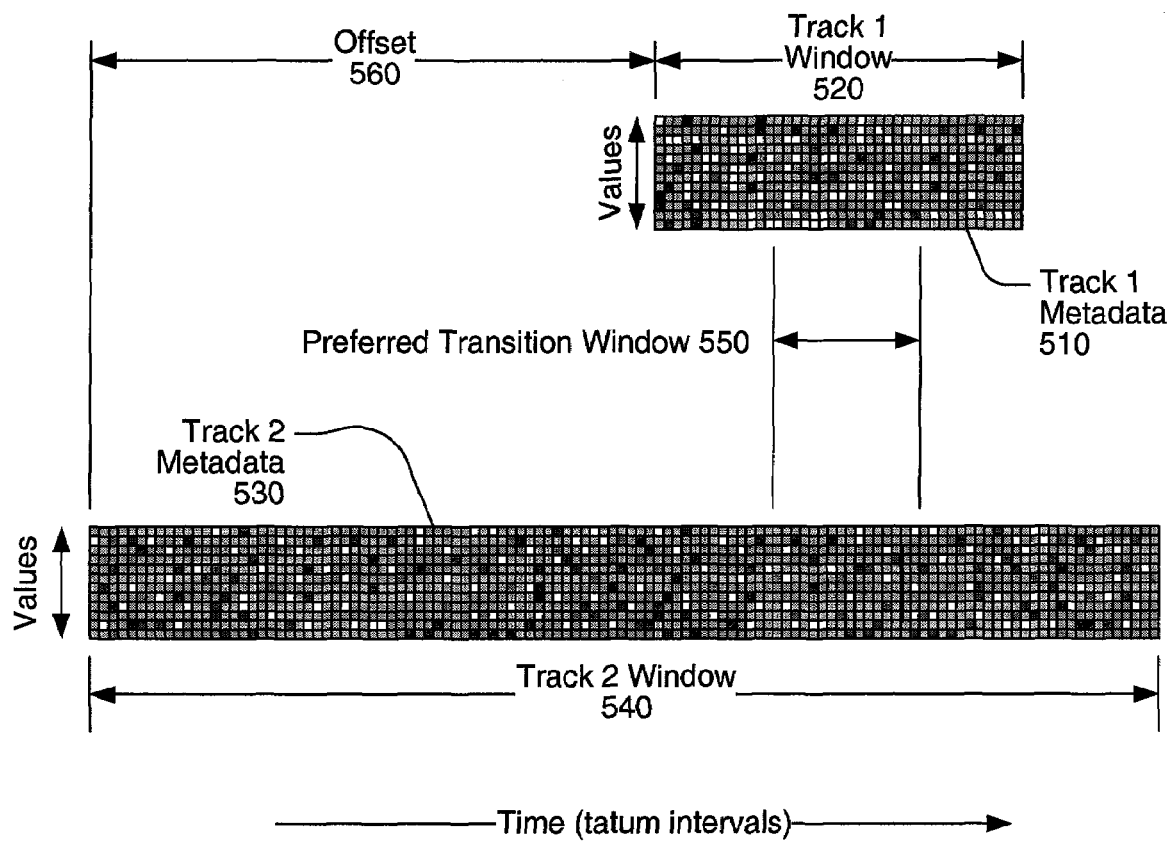
FIG. 5 is a graphical depiction of the process of FIG. 4.

FIG. 5 is an example of results when the process 450 is used to align two audio tracks. In this example, the acoustic metadata for the first track 510 and the acoustic metadata for the second track 530 are assumed to have twelve values per tatum sample. These twelve values may be, by way of further example, an eleven-element timbral vector augmented with a value indicating the total volume of each tatum sample. A first window 520, or a portion of the first track where segueing to the second track may occur, has been defined to be 40 tatum intervals in length. The acoustic metadata 510 within the first window 520 is depicted by a matrix of 40 by 12 squares representing 40 tatum samples by 12 values. The lightness or darkness of each square indicates the numerical value of the corresponding acoustic metadata. Similarly, a second window 540, or a portion of the second track where a segue from the first track may occur, has been defined to be 116 tatum intervals in length. The acoustic metadata 530 within the second window 540 is depicted by a matrix of 12 by 116 shaded squares. The transition portion of each track has been defined to be 16 tatum intervals.

Each possible 12 element by 16 tatum transition portion of the first window 540 has been compared to each possible 12 element by 16 tatum transition portion of the second window 520. FIG. 5 shows the first and second windows aligned such that the two most similar transition portions are aligned as a preferred transition window 560. Once the most similar transition portions have been identified, the location of each portion within its respective track can be determined. The appropriate offset 560 between the tracks can also be determined such that segueing from the first track to the second track can be performed during the preferred transition window.

Figure 6:
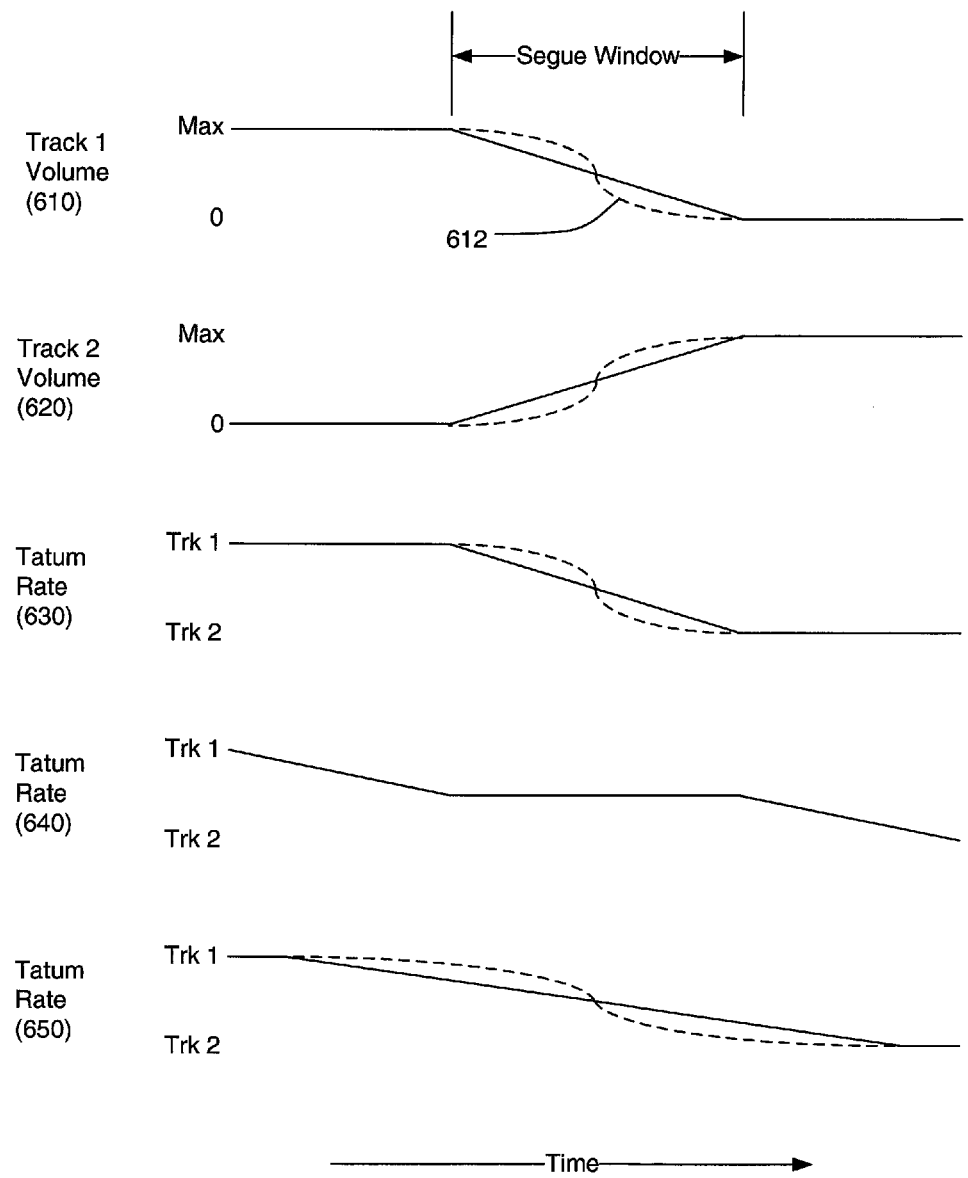
FIG. 6 is an exemplary timing diagram for segueing between two audio tracks.

FIG. 6 includes timing diagrams that illustrates exemplary approaches to segueing from a first track to a second track. The diagrams 610 and 620 show the volumes of the first and second tracks, respectively. The diagrams 630, 640, and 650 show alternative approaches to transitioning from the tatum rate of the first track to the tatum rate of the second track.

During the segue window 605, which may be a preferred transition window as previous described, the volume of the two tracks may be cross-faded. As shown in diagram 610, the volume of the first track may be reduced linearly or nonlinearly as indicated by the dashed line 612. Simultaneously, as shown in the diagram 620, the volume of the second track may be increased linearly or nonlinearly. The increase and decrease of the volumes of the first and second track, respectively, may be coordinated such that the overall volume heard by a listener remains essentially constant, which may be known as equal power cross-fading.

The diagrams 630, 640, and 650 show three exemplary ways to transition the tatum rate of the two tracks from the tatum rate of the first track to the tatum rate of the second track in conjunction with cross-fading the volumes of the two tracks. Each of these examples assumes that the tatum rates of the two tracks were equalized prior to the start of the segue window 605. The diagram 630 shows that the tatum rate of the two tracks may transition, linearly or nonlinearly, from the tatum rate of the first track to the tatum rate of the second track during the segue window 605. The diagram 640 shows that the tatum rates of the two track may transition from the tatum rate of the first track to an intermediate rate before the start of the segue window, and may transition from the intermediate rate to the tatum rate of the second track after the segue window. The diagram 650 shows that the transition of the tatum rates may occur linearly or nonlinearly over a different period (a longer period in this example) than the segue window.

Figure 7:
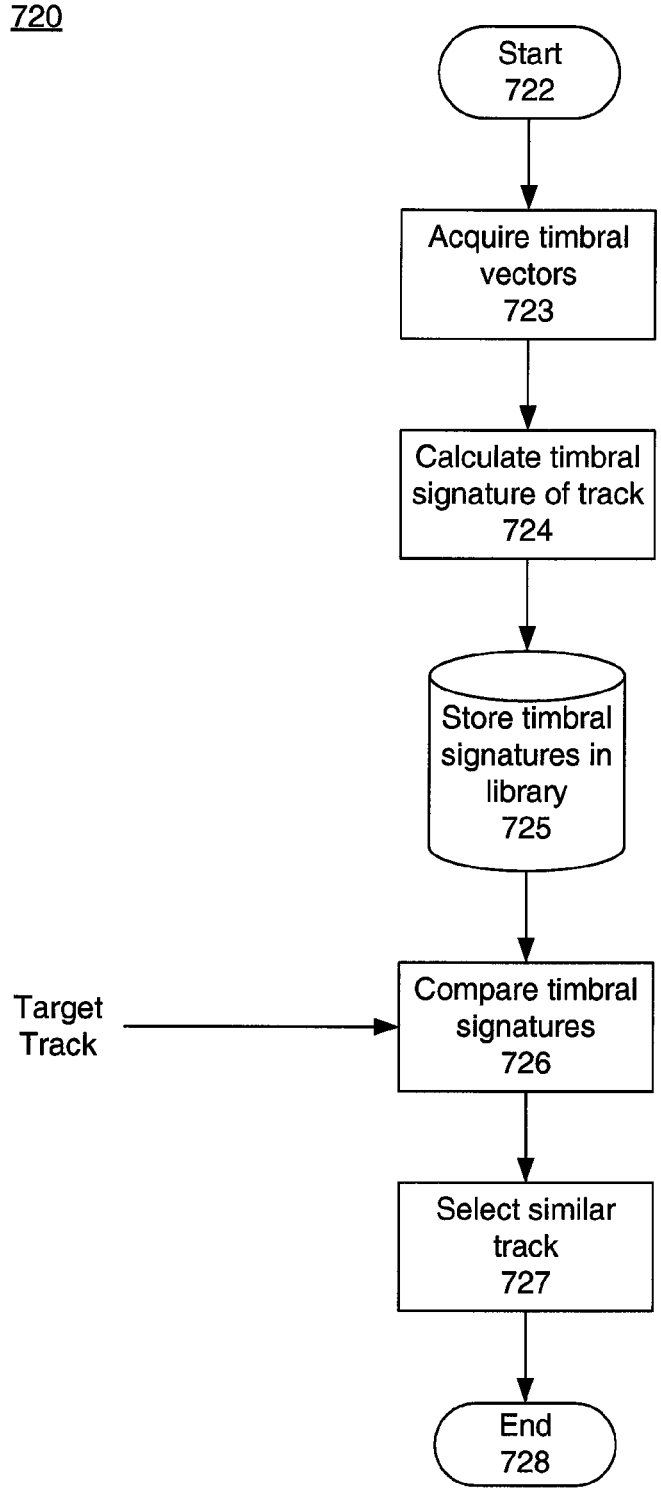
FIG. 7 is a flow chart of a process for identifying similar tracks.

Referring now for FIG. 7, a process 720 for determining the acoustic similarity of audio tracks may be suitable for use at 120 of the process 100. While the process 720 is shown as having a start 722 and an end 728, it must be understood that the portions of the process from 723 to 725 may be repeated for a large plurality of audio tracks, and the elements 726 and 728 may be performed only as part of a similarity search.

At 723, acoustic metadata, which may be a set of timbral vectors or augmented timbral vectors, describing an audio track may be acquired. The acoustic metadata may be retrieved from a library of acoustic metadata, or may be calculated from an audio track using a process such as the process 230.

At 724, a timbral signature of the audio track may be calculated. The timbral signature may be calculated by first calculating the covariance matrix of the acoustic metadata for the audio track. Since the covariance matrix is inherently diagonal, the lower triangular portion may be discarded and the remaining data may be saved as the timbral signature of the audio track. For example, assuming the acoustic metadata for each segment of the audio track is a 12-element augmented timbral vector. The covariance matrix will be a 12×12 matrix that is symmetrical about the diagonal. The lower triangular region below the diagonal may be discarded and the remaining 78 values may be stored at 725 as the timbral signature of the audio track.

At 726, the timbral signature of a target audio track may be compared with the timbral signatures of the other audio tracks in a database or library of audio tracks. For example, the timbral signatures may be considered to be vectors and the comparison may be performed by calculating the Euclidean distance between the timbral signature of the target audio track and the timbral signature of each of the other audio tracks in the library. The audio track having the smallest Euclidean distance between its timbral signature and the timbral signature of the target track may be selected at 727 as the audio track that sounds most similar to the target audio track.

Description of Apparatus

Figure 8:
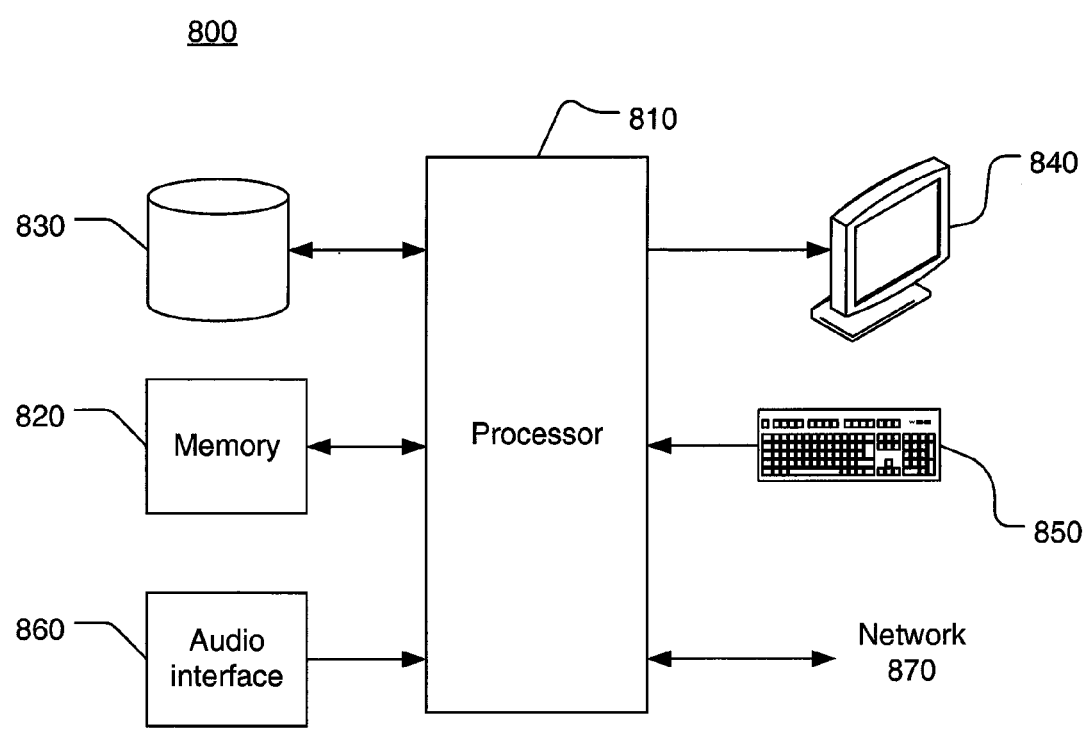
FIG. 8 is a block diagram of a computing device.

FIG. 8 is a block diagram of a computing device 800 that may be suitable for executing the previously described methods. A computing device as used herein refers to any device with a processor 810, memory 820 and a storage device 830 that may execute instructions including, but not limited to, personal computers, server computers, computing tablets, set top boxes, video game systems, personal video players, personal digital assistants (PDAs), cellular telephones, e-mail clients, personal music players, portable computers, and laptop computers. These computing devices may run an operating system, including, for example, variations of the Linux, Unix, MS-DOS, Microsoft Windows, Palm OS, Solaris, Symbian, and Apple Mac OS X operating systems.

The computing device 800 may include or interface with a display device 840 and input device 850. The computing device 800 may also include an audio interface unit 860 which may include one or more analog to digital converters. The audio interface 860 may provide audio signals to one or more amplifiers (not shown) and/or speakers (not shown) for playing audio tracks. The computing device 800 may also interface with one or more networks 870. The interface between the computing device 800 and the network 870 may be wired or wireless. The network 870 may be the Internet or any other private or public network.

The storage device 830 may accept a storage media containing instructions that, when executed, cause the computing device 800 to perform processes such as the processes 100, 230, 450, and 720 of FIG. 1, FIG. 2, FIG. 4, and FIG. 7 respectively. These storage media include, for example, magnetic media such as hard disks, floppy disks and tape; optical media such as compact disks (CD-ROM and CD-RW) and digital versatile disks (DVD and DVD+RW); flash memory cards; and other storage media. As used herein, a storage device is a device that allows for reading and/or writing to a storage medium. Storage devices include hard disk drives, DVD drives, flash memory devices, and others.

The storage device 830 may include one or more storages devices within the computing device 800 and one or more storage devices coupled to the computing device 800 by means of a network. The storage device 830 may store a library of audio tracks. The library may include stored acoustic metadata for some or all of the stored audio tracks.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

The invention claimed is:

1. A method for music presentation, comprising:
    resampling acoustic metadata for a first track at a rhythmic rate of the first track
    resampling acoustic metadata for a second track at a rhythmic rate of the second track
    performing a sliding window comparison of the resampled acoustic metadata for the first audio track and the resampled acoustic metadata for the second audio track to determine a preferred transition window
    segueing from playing the first track to playing the second track during the preferred transition window.

2. The method of claim 1, wherein the resampling, comparing and segueing are done automatically without user intervention.

3. The method of claim 1, wherein comparing the resampled acoustic metadata for the first audio track and the resampled acoustic metadata for the second audio track further comprises identifying and aligning portions of the first track and the second track that sound the most similar.

4. The method of claim 1, wherein the rhythmic rate of the first track and the rhythmic rate of the second track are the tatum rates for the respective tracks.

5. The method of claim 1, wherein the acoustic metadata comprises timbral vectors.

6. The method of claim 5, wherein timbral vectors are calculated by the formula:

$$V_i = W \times (F_i - M)$$

wherein:
    $V_i$=timbral vector for the i'th segment of a track
    W=a weight matrix calculated from a training data set consisting of a large number of randomly selected tracks
    $F_i$=data vector describing the timbral surface of the i'th segment
    M=a mean vector calculated from the training data set.

7. The method of claim 6, wherein the weight matrix is calculated using principle component analysis.

8. The method of claim 1, wherein performing a sliding-window comparison further comprises
    defining a track 2 window including N consecutive samples of the resampled acoustic metadata for the second track
    defining a track 1 window including M consecutive samples of the resampled acoustic metadata for the first track
    defining a transition portion length of K samples, where $K \leq M$ and $K \leq N$
    comparing each possible set of K consecutive samples within the track 2 window with each possible set of K consecutive samples within the track 1 window.

9. The method of claim 8, wherein two sets of K consecutive samples are compared by treating each set of samples as a vector and calculating the Euclidean distance between the two vectors.

10. The method of claim 1, wherein segueing from playing the first track to playing the second track further comprises:
    cross fading the volume of the first track and the second track
    time-scaling at least one of the first track and the second track to equalize the tatum rates of the two tracks.

11. The method of claim 1, wherein segueing from playing the first track to playing the second track further comprises:
    smoothly transitioning from the tatum rate of the first track to the tatum rate of the second track.

12. The method of claim 1, further comprising:
    automatically selecting the second track that sounds similar to the first track.

13. The method of claim 12, wherein automatically selecting the second track further comprises:
  comparing acoustic metadata of the first track with acoustic metadata for a plurality of tracks stored in a music library
  selecting a second track based on the results of the comparing.

14. The method of claim 13, wherein comparing acoustic metadata comprises comparing the covariance matrix of the timbral vectors of the first track with the covariance matrices of the timbral vectors for the plurality of tracks.

15. A nontransitory storage medium having instructions stored thereon which, when executed, will cause a computing device to perform actions comprising:
  resampling acoustic metadata for a first track at a rhythmic rate of the first track
  resampling acoustic metadata for a second track at a rhythmic rate of the second track
  performing a sliding window comparison of the resampled acoustic metadata for the first audio track and the resampled acoustic metadata for the second audio track to determine a preferred transition window
  segueing from playing the first track to playing the second track during the preferred transition window.

16. The storage medium of claim 15, wherein the resampling, comparing and segueing are done automatically without user intervention.

17. The storage medium of claim 15, wherein comparing the resampled acoustic metadata for a first audio track and the resampled acoustic metadata for a second audio track further comprises identifying and aligning portions of the first track and the second track that sound the most similar.

18. The storage medium of claim 15, wherein the rhythmic rate of the first track and the rhythmic rate of the second track are the tatum rates for the respective tracks.

19. The storage medium of claim 15, wherein the acoustic metadata comprises timbral vectors.

20. The storage medium of claim 19, wherein timbral vectors are calculated by the formula:

$$V_i = W \times (F_i - M)$$

wherein:
  $V_i$ = timbral vector for the i'th segment of a track
  $W$ = a weight matrix calculated from a training data set consisting of a large number of randomly selected tracks
  $F_i$ = data vector describing the timbral surface of the i'th segment
  $M$ = a mean vector calculated from the training data set.

21. The storage medium of claim 20, wherein the weight matrix is calculated using principle component analysis.

22. The storage medium of claim 15, wherein performing a sliding-window comparison further comprises
  defining a track 2 window including N consecutive samples of the the resampled acoustic metadata for the second track
  defining a track 1 window including M consecutive samples of the the resampled acoustic metadata for the first track
  defining a transition portion length of K samples, where $K \leq M$ and $K \leq N$
  comparing each possible set of K consecutive samples within the track 2 window with each possible set of K consecutive samples within the track 1 window.

23. The storage medium of claim 22, wherein two sets of K consecutive samples are compared by treating each set of samples as a vector and calculating the Euclidean distance between the two vectors.

24. The storage medium of claim 15, wherein segueing from playing the first track to playing the second track further comprises:
  cross fading the volume of the first track and the second track
  time-scaling at least one of the first track and the second track to equalize the tatum rates of the two tracks.

25. The storage medium of claim 15, wherein segueing from playing the first track to playing the second track further comprises:
  smoothly transitioning from the tatum rate of the first track to the tatum rate of the second track.

26. The storage medium of claim 15, the actions performed further comprising:
  automatically selecting the second track that sounds similar to the first track.

27. The storage medium of claim 26, wherein automatically selecting the second track further comprises:
  comparing acoustic metadata of the first track with acoustic metadata for a plurality of tracks stored in a music library
  selecting a second track based on the results of the comparing.

28. The storage medium of claim 27, wherein comparing acoustic metadata comprises comparing the covariance matrix of the timbral vectors of the first track with the covariance matrices of the timbral vectors for the plurality of tracks.

* * * * *